United States Patent
Jansson et al.

(10) Patent No.: US 8,607,776 B2
(45) Date of Patent: Dec. 17, 2013

(54) BARBECUE

(75) Inventors: Mattias Jansson, Hennigsdorf (DE);
Christoph Schaden, Jagerberg (AT)

(73) Assignee: Electrolux Home Products Corporation, Brussels (BE)

( * ) Notice: Subject to any disclaimer, the term of this patent is extended or adjusted under 35 U.S.C. 154(b) by 756 days.

(21) Appl. No.: 12/528,338

(22) PCT Filed: Feb. 4, 2008

(86) PCT No.: PCT/EP2008/000865
§ 371 (c)(1),
(2), (4) Date: Mar. 31, 2010

(87) PCT Pub. No.: WO2008/104264
PCT Pub. Date: Sep. 4, 2008

(65) Prior Publication Data
US 2010/0275898 A1 Nov. 4, 2010

(30) Foreign Application Priority Data
Feb. 28, 2007 (EP) .................................. 07004139

(51) Int. Cl.
*F24B 3/00* (2006.01)
(52) U.S. Cl.
USPC ............... 126/25 R; 126/25 AA; 220/811; 220/812; 312/26; 312/28
(58) Field of Classification Search
USPC ..... 126/25 R, 25 AA; 99/339, 340, 352, 355, 99/400, 401, 419–421 V, 444–450, 481, 99/482; 426/523; 312/24–29, 183, 192; 220/263, 811, 812, 817, 908
See application file for complete search history.

(56) References Cited

U.S. PATENT DOCUMENTS

| 401,314 | A | * | 4/1889 | Travis | 312/26 |
| 503,418 | A | * | 8/1893 | Horrooks | 312/25 |
| 1,008,143 | A | * | 11/1911 | Hart | 312/26 |
| 2,201,161 | A | * | 5/1940 | Deans | 220/812 |
| 2,338,477 | A | * | 1/1944 | Wolters et al. | 220/812 |

(Continued)

FOREIGN PATENT DOCUMENTS

| DE | 20013107 U1 | 12/2000 |
| FR | 2747283 A1 | 10/1997 |
| GB | 2365320 A1 | 2/2002 |

OTHER PUBLICATIONS

International Search Report dated Apr. 16, 2008, provided for PCT application No. PCT/EP2008/000865.

*Primary Examiner* — Kenneth Rinehart
*Assistant Examiner* — Bao D Nguyen
(74) *Attorney, Agent, or Firm* — Workman Nydegger

(57) ABSTRACT

The invention relates to a barbecue comprising a carrier element, a grilling area being substantial horizontal orientated and being located at the top of the carrier element and a cover, wherein the cover can be positioned in a first position in which the grilling area is covered and in a second position in which the grilling area is accessible. To improve the functionality of such a barbecue, the invention suggests that means are provided to allow the cover to move from the first position into the second position, wherein the cover is pivoted during the movement from the first position into the second position around a horizontal axis and wherein the barycenter of the cover is moved from a first level to a second, lower level.

17 Claims, 9 Drawing Sheets

(56) References Cited

U.S. PATENT DOCUMENTS

| | | | | |
|---|---|---|---|---|
| 2,549,545 A * | 4/1951 | Thibieroz | 312/221 |
| 3,614,184 A * | 10/1971 | Yawata et al. | 312/188 |
| 3,995,764 A * | 12/1976 | Zagami | 220/263 |
| 4,048,050 A * | 9/1977 | Hillman | 206/1.5 |
| 4,349,713 A * | 9/1982 | Marsen | 219/739 |
| 4,369,763 A * | 1/1983 | Sullivan | 126/276 |
| 4,646,711 A * | 3/1987 | Oliphant | 126/9 R |
| D299,305 S * | 1/1989 | Vollborn | D7/332 |
| 4,895,131 A * | 1/1990 | Overholser | 126/41 R |
| 5,168,796 A * | 12/1992 | Porton et al. | 99/340 |
| 5,183,027 A * | 2/1993 | Saldana | 126/25 R |
| 5,251,775 A * | 10/1993 | Kruzick et al. | 220/812 |
| 5,645,041 A * | 7/1997 | Yu | 126/25 R |
| 5,720,217 A * | 2/1998 | Pappas | 99/421 H |
| 5,775,315 A * | 7/1998 | Baykal | 126/25 R |
| 5,918,536 A * | 7/1999 | Cheng | 99/447 |
| 6,038,965 A * | 3/2000 | Thorndyke | 99/340 |
| 6,065,466 A * | 5/2000 | Baykal | 126/41 R |
| 6,837,152 B1 * | 1/2005 | Chiang | 99/422 |
| D602,148 S * | 10/2009 | DeFouw et al. | D23/403 |
| D603,037 S * | 10/2009 | DeFouw et al. | D23/403 |
| 2003/0111070 A1 * | 6/2003 | DeMars | 126/25 R |
| 2005/0051150 A1 * | 3/2005 | Scheer Viapiana | 126/41 B |
| 2005/0133018 A1 * | 6/2005 | Spangrud | 126/41 R |
| 2007/0006867 A1 * | 1/2007 | Karney et al. | 126/37 B |
| 2008/0078373 A1 * | 4/2008 | Kim et al. | 126/192 |
| 2008/0163862 A1 * | 7/2008 | Cartwright | 126/25 R |
| 2010/0031950 A1 * | 2/2010 | Paslawski | 126/25 R |

* cited by examiner

BARBECUE

BACKGROUND OF THE INVENTION

1. Field of the Invention

The invention relates to a barbecue comprising a carrier element, a grilling area being substantial horizontal orientated and being located at the top of the carrier element and a cover, wherein the cover can be positioned in a first position in which the grilling area is covered and in a second position in which the grilling area is accessible.

2. Background and Relevant Art

Barbecues of this kind are well known in the art. They are normally used as outdoor barbecues and have a quite large size. The barbecues can use gas, electricity or charcoal. They have a top or cover in order to cover and protect the grilling area when the barbecue is not used and which can be swung open when the barbecue is in use. In some pre-known barbecues the top cover encloses a considerable volume and can be closed even for cooking.

During use, the cover is swung up into an open position in order to allow access to the grill. However, this has the disadvantage that the top cover sticks up and forms a high barrier at the rear end of the barbecue. This makes it difficult or even impossible for persons who stand at the rear end side of the barbecue to freely look at the grill, to see the food that is being cooked and to freely communicate with the person who does the cooking at the barbecue. This is insofar a considerable drawback of the barbecues of the kind mention above especially during a social event, in particular in a garden party.

Another disadvantage of the prior art barbecues is that they have sometimes a cover with such volume and form that even smoke and heat it lead into the face and especially into the eyes of the person cooking on it.

BRIEF SUMMARY OF THE INVENTION

Therefore, it is an object of the invention to improve a barbecue of the type mentioned above which avoids the discussed drawbacks. It should become possible to have a good sight to the grilling area from all sides of the barbecue. The cover should not hinder communication. Furthermore, there should not be any unnecessary feeding of smoke from the grilling area to the person using the barbecue.

The solution of this object according to the invention is characterized in that means are provided to allow the cover of the barbecue to move from the first position into the second position, wherein the cover is pivoted during the movement from the first position into the second position around a horizontal axis and wherein the barycentre of the cover is moved from a first level to a second, lower level.

Preferably the cover has a substantially flat shape. Furthermore, the cover can be in a substantial horizontal orientation in the first position and in a substantial vertical orientation in the second position.

The upper end of the cover—when being in the second position—can protrude an extension upwards from the upper surface of the grilling area which is between 10% and 40% of the length of the cover.

The means for moving the cover forth and back can comprise two stationary guiding elements being fixed at the carrier element and being located laterally at both sides of the covet and two cranks machined in the lateral sides of the cover, wherein the guiding elements protrude into the cranks.

The cover can be substantial arranged at the rear side of the carrier element when being in the second position.

At least one tray panel can be arranged adjacent to the cover when being in the first, closed position. Specifically, a plurality of tray panels can be arranged adjacent to the cover on three sides of the cover. The cover—when being in the first position—and the at least one tray panel can have flushing upper surfaces.

At least one bearing hole for a skewer can be arranged in the cover, extending horizontally when the cover is in the second, open position. At least one bearing element for the skewer can be arranged at the front side of the barbecue to specifically support heavy skewers.

The carrier element can have at least one compartment. This compartment can be thermally insulated. This is specifically useful if a refrigerator is arranged in the compartment.

The barbecue can be of the charcoal type, can have at least one electrical heating element or can have at least one gas heating element.

With the proposed solution it is ensured that from all sides of the barbecue the grilling area can be seen easily. Furthermore, the cover is no obstacle for communication between the persons standing around the barbecue. Also there is no feeding of smoke to the person using the barbecue.

BRIEF DESCRIPTION OF THE DRAWINGS

In the drawings embodiments of the invention are depicted.

DETAILED DESCRIPTION OF THE PREFERRED EMBODIMENTS

Figure 2:
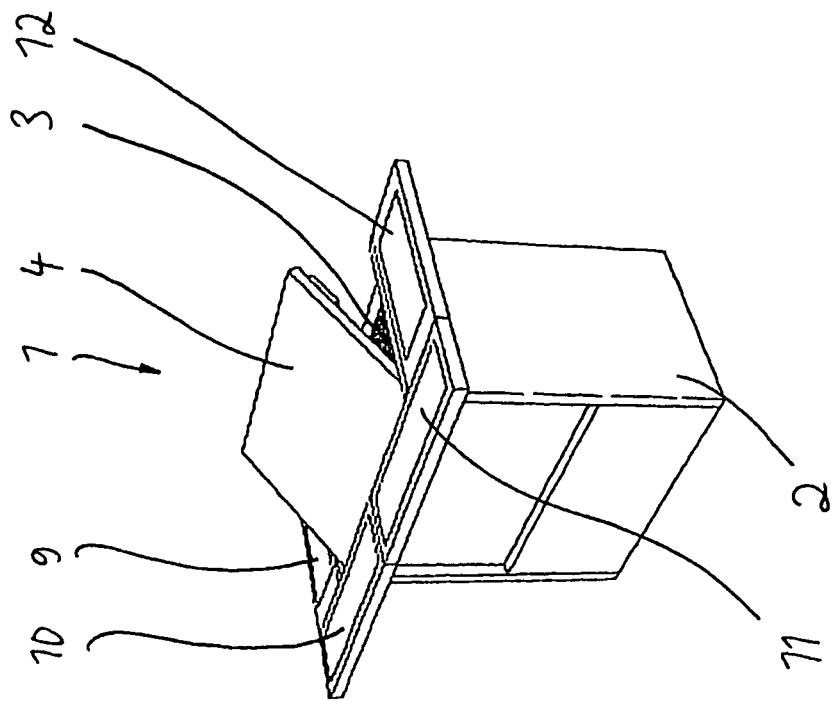
FIG. 2 shows the barbecue according to FIG. 1, wherein the cover is in an early phase of opening.
Figure 1:
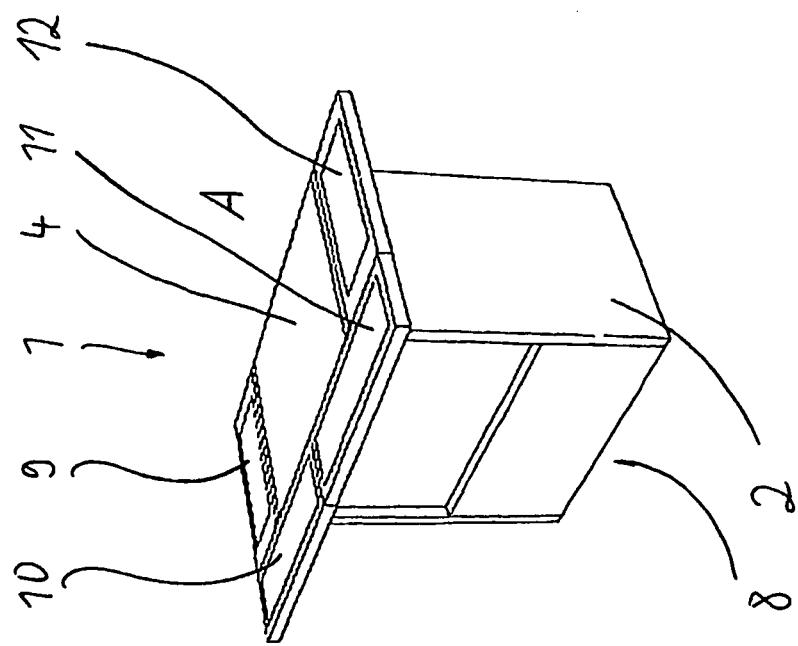
FIG. 1 shows schematically a perspective view of a barbecue seen from the rear side of it, wherein the cover of it is in a first, closed position.
Figure 4:
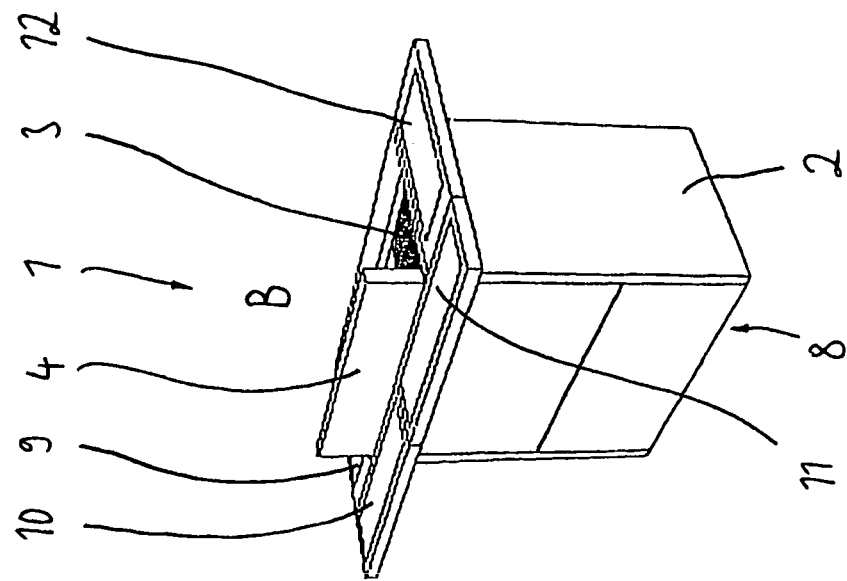
FIG. 4 shows the barbecue according to FIG. 1, wherein the cover is fully in a second, open position.
Figure 3:
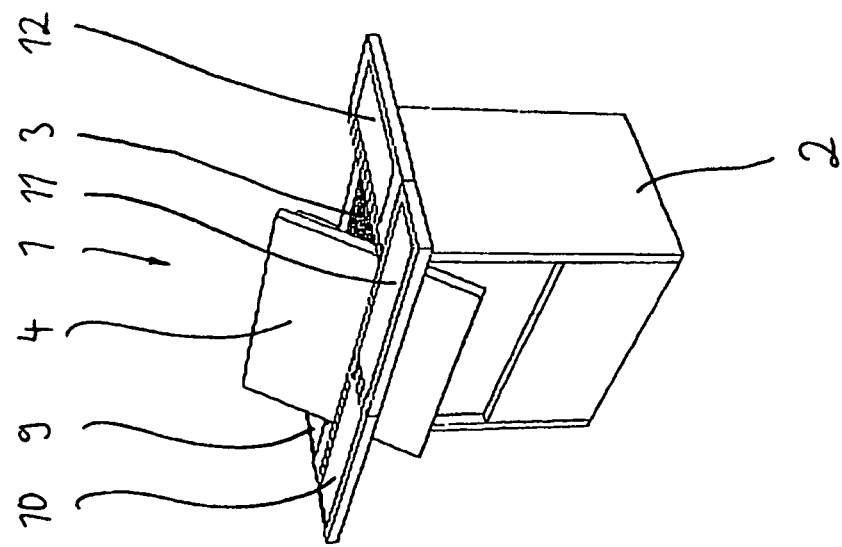
FIG. 3 shows the barbecue according to FIG. 1, wherein the cover is in an later phase of opening.
Figure 5:
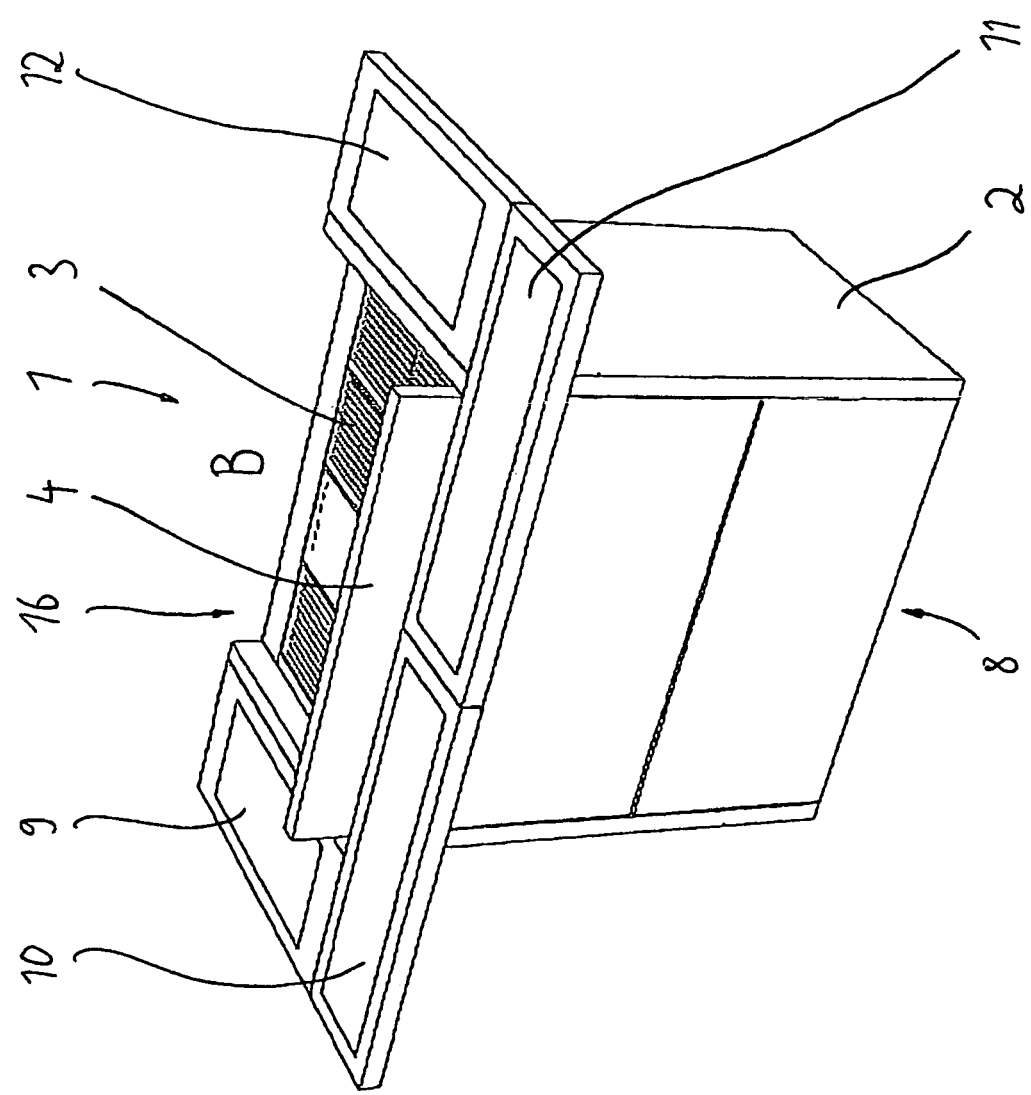
FIG. 5 shows the barbecue according to FIG. 4 in an enlarged view.

Referring now to FIG. 1 till FIG. 5 it can be seen that a barbecue 1, e. g. of the gas heating type, has a carrier element 2 with a substantial cuboid form. On the upper side of the carrier element 2 a grilling area (grill) 3 is arranged in a well known manner, on which the food to be grilled is placed. The barbecue 1 is of the type having a cover 4 which can be in a first, closed position A (see FIG. 1) or in a second, open position B (see FIG. 4, 5). The cover 4 is moved from one position A, B to the other manually.

As can further be seen, the cover 4 has a panel-shaped form, i. e. it is substantially flat. If it is in the first, closed position A it is oriented in a horizontal plane. If the cover 4 is moved into the second, open position B it is in a substantial vertical orientation as can be seen in FIG. 4 and FIG. 5.

The barbecue 1 has four flat tray panels 9, 10, 11, 12 which surround the grilling area 3 from three sides, i. e. laterally and at the rear side 8 of the carrier element 2. When the cover 4 is in the first, closed position A, the cover and the four tray panels 9, 10, 11, 12 are in a flushing orientation. Thus, the barbecue 1 can be used with closed cover 4 as a table. On the front side 16 (see FIG. 6) no tray panels is arranged, because here it is necessary to approach the grilling area.

By comparison of FIG. 1 till FIG. 4 it can be seen how the cover 4 moves step by step to come from the first, closed position A to the second, opened position B.

Figure 6:
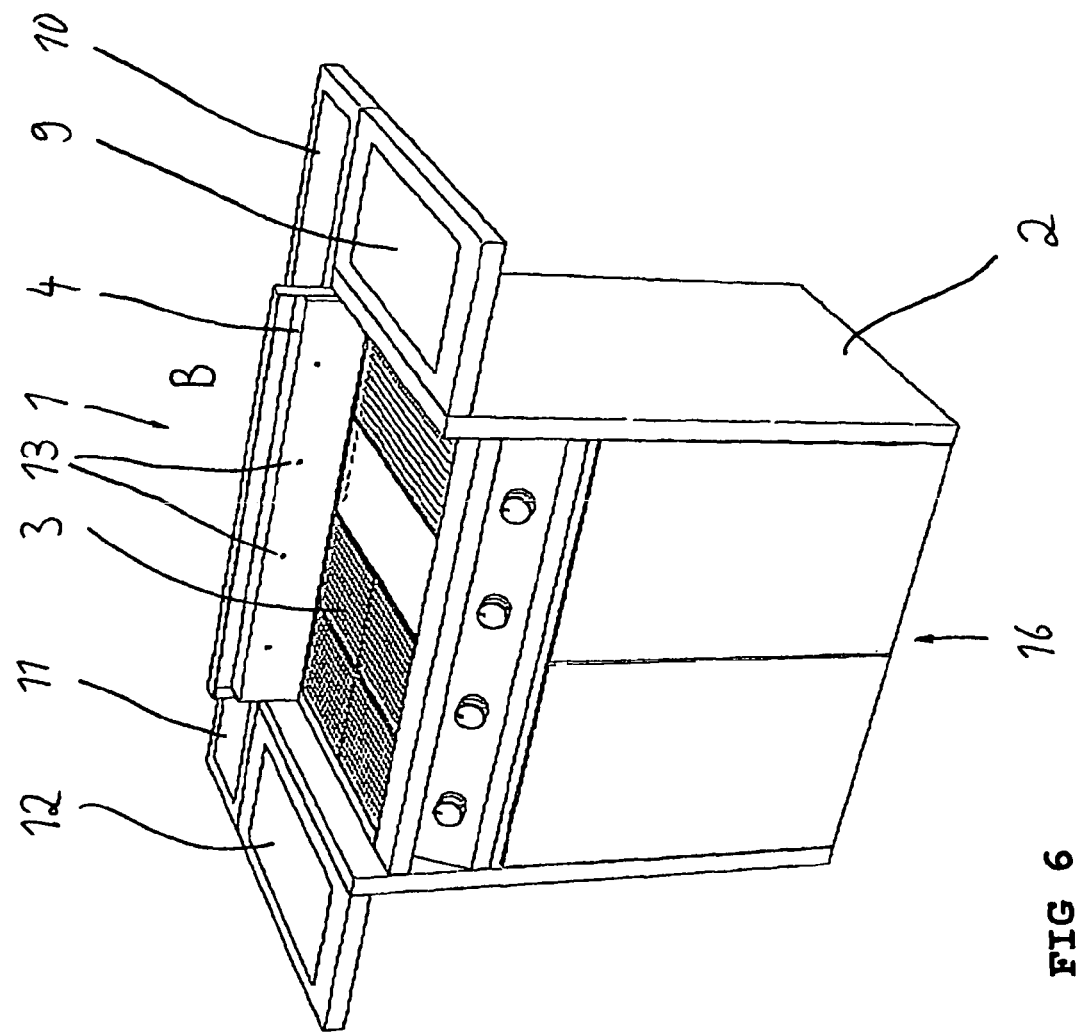
FIG. 6 shows the barbecue according to FIG. 5 but seen from the front side.
Figure 7:
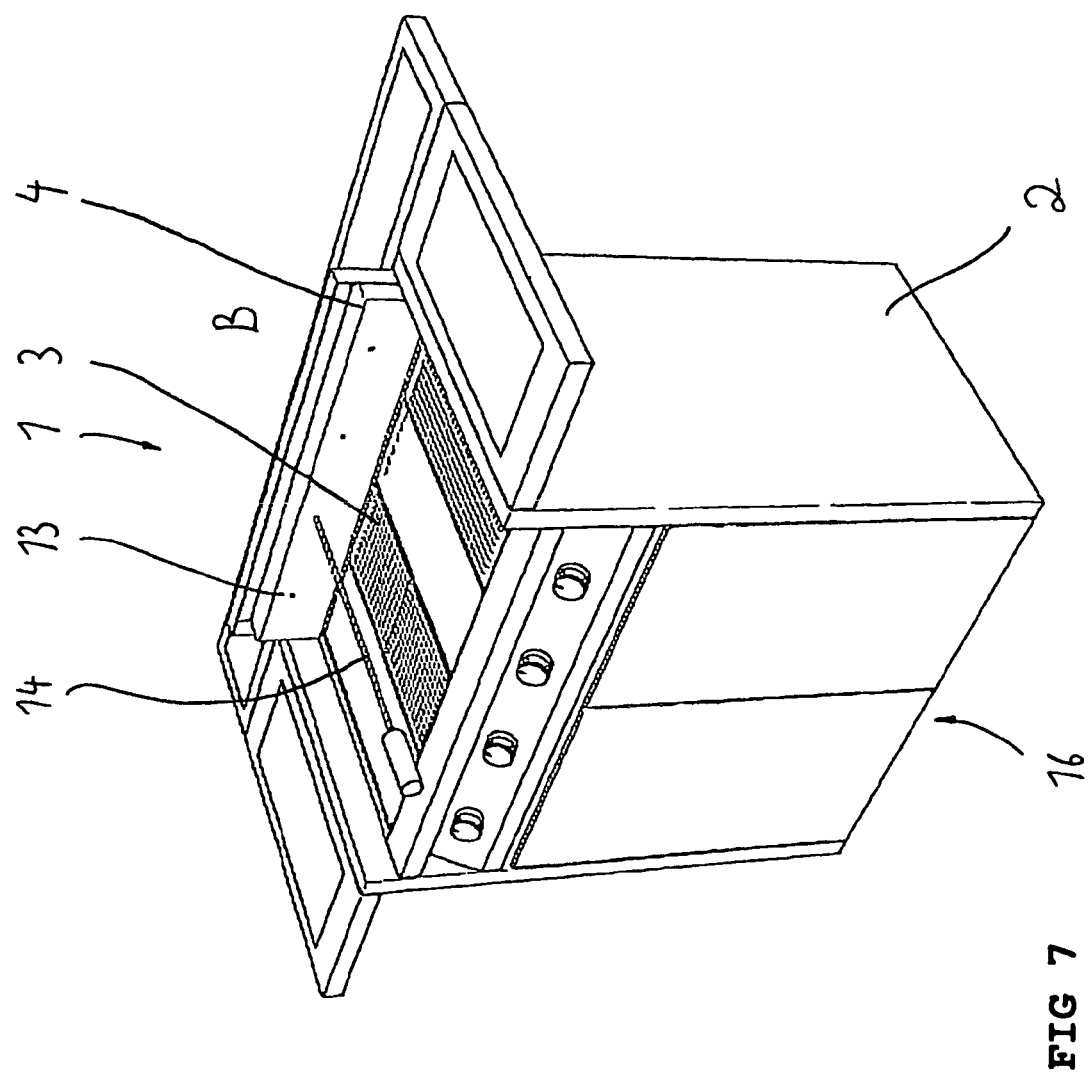
FIG. 7 shows the barbecue according to FIG. 5 with a skewer according to a first embodiment of the support of the skewer.

In FIG. 6 it can be seen that the cover 4 has a plurality of bearing holes 13 which are machined into the cover 4. Those bearing holes can be used to insert a skewer or roasting spit 14 as shown in FIG. 7. The end of the skewer 14 remote from the bearing hole 13 can lie on the edge of the barbecue 1 at its front side 16.

Figure 8:
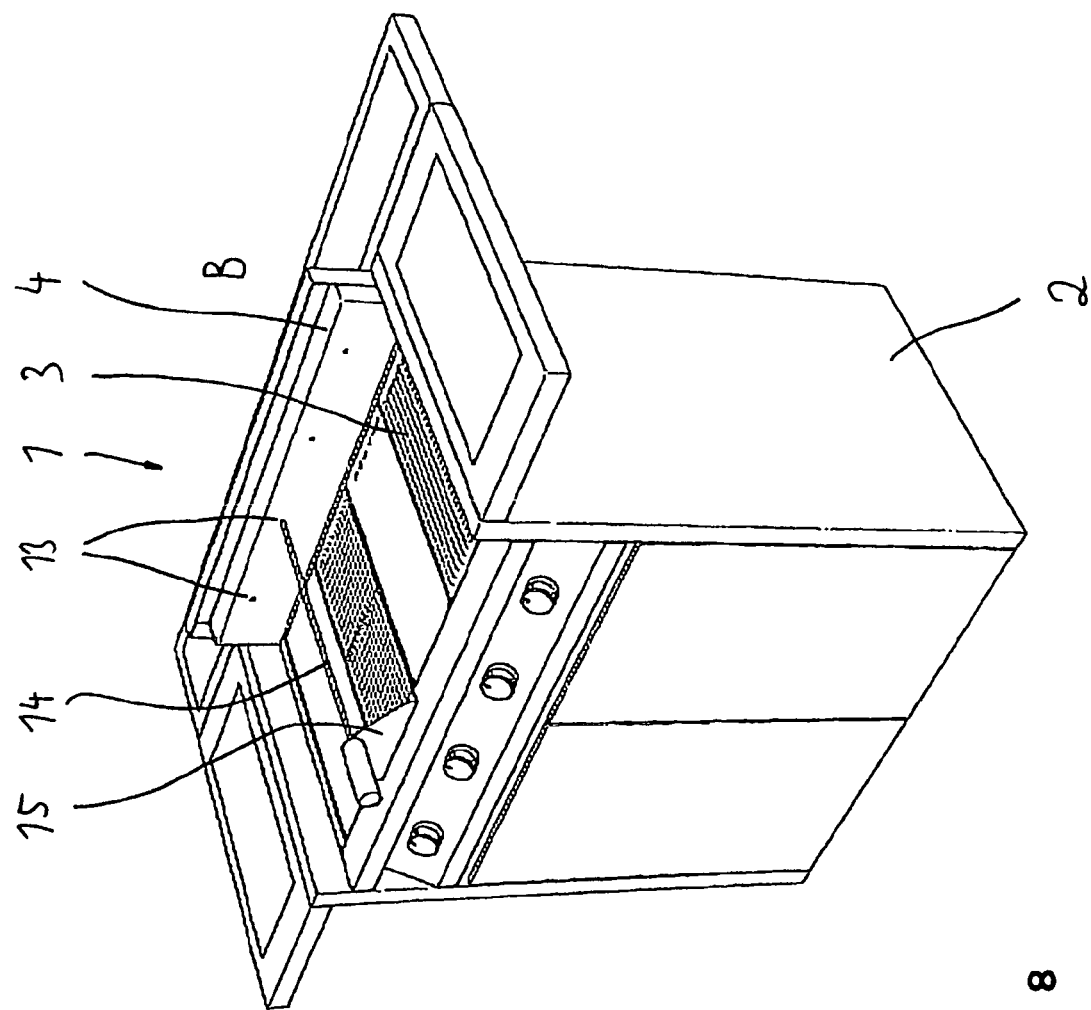
FIG. 8 shows the barbecue according to FIG. 5 with a skewer according to a second embodiment of the support of the skewer.

As an alternative as depicted in FIG. 8 a bearing element 15 can be arranged in the region of the front side 16 of the barbecue 1 for supporting the skewer 14. The arrangement can comprise a motor that slowly rotates the skewer 14, depending if electricity shall be included in the barbecue 1. Otherwise, the skewer 14 is manually turned.

The bearing holes 13 can also be used for fixation of a tray or of griddles on which already cooked food can be kept warm (not depicted).

Figure 9:
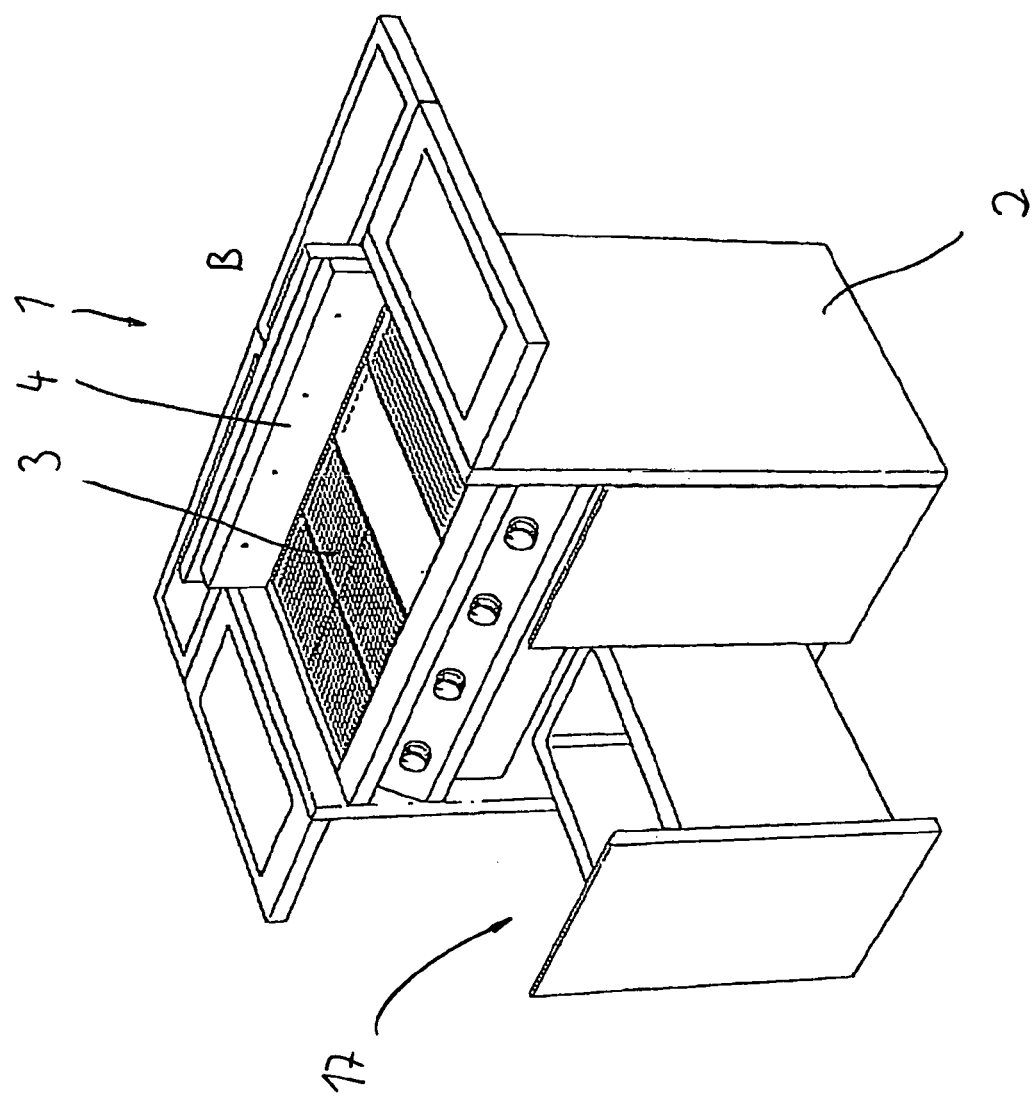
FIG. 9 shows the barbecue according to FIG. 5 with the depiction of a compartment.

In FIG. 9 it is shown that the barbecue 1 and more specifically its carrier element 2 can have compartments 17. According to one example the compartment 17 can be thermally insulated and a refrigerator can be built in the compartment 17. The refrigerator can be operated by electricity or gas. As the drawer is thermally insulated it can kept cold by means of freezer block or ice.

Figure 10:
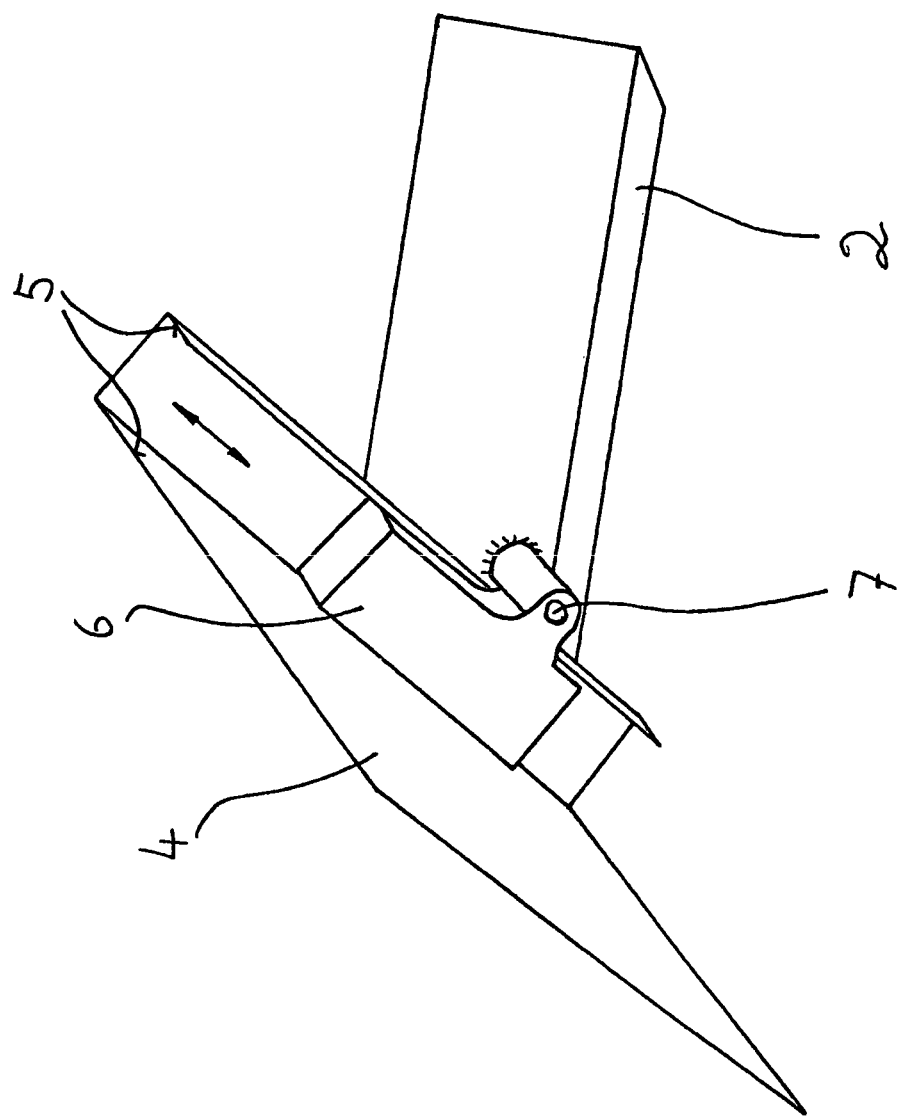
FIG. 10 shows schematically a perspective view of a part of the cover of the barbecue in an intermediate position between the closed and opened position.
Figure 12:
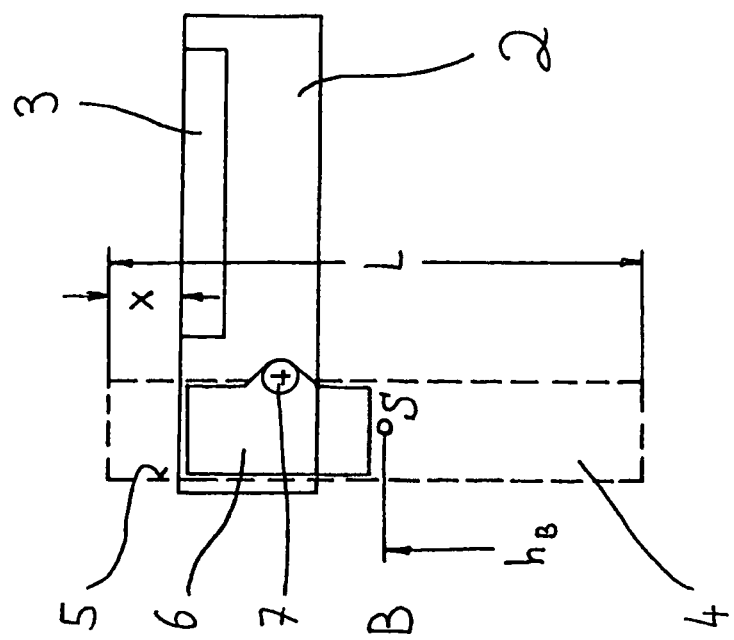
FIG. 12 shows a schematic side view of a part of the barbecue with the cover being in the second, opened position.

In FIG. 10 an embodiment of the means 5, 6 for moving the cover 4 of the barbecue 1 is illustrated in an intermediate position between a first, closed position A (shown in FIG. 11) and a second, opened position B (shown in FIG. 12).

As can be seen from FIG. 10 the cover 4 has a U-shaped form in the side region establishing a crank 5, i. e. a guidance which allows the cover 4 to move along a direction denoted by the double-headed arrow relatively to a guiding element 6. The guiding element 6 is basically a cuboid-shaped body which is grasped by the "U" of the cover 4, i. e. by the crank 5. The guiding element 6 is fixed relatively to the carrier element 2, but is pivotably arranged by means of a horizontal axis 7.

Consequently, the cover 4 can be pivoted around the axis 7 relatively to the carrier element 2 and can slide relatively to the guiding element 6 in the direction to the double-headed arrow.

By this mechanism the cover 4 can be moved between the first, closed position A and the second, opened position B as depicted in FIG. 1 till FIG. 4.

Figure 11:
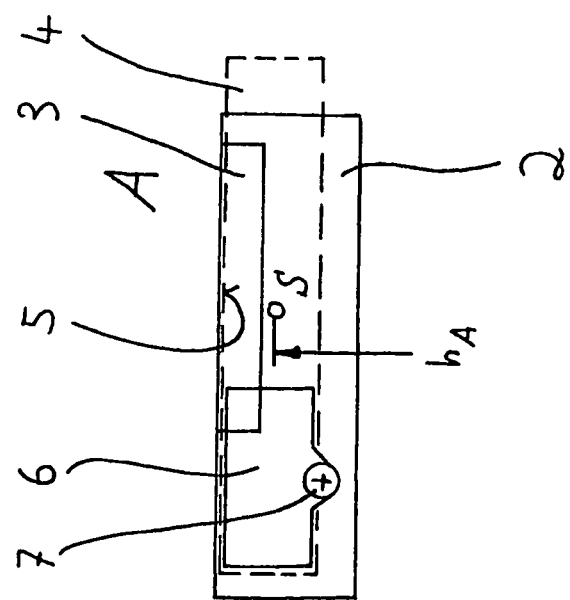
FIG. 11 shows a schematic side view of a part of the barbecue with the cover being in the first, closed position

In FIG. 11 the side view of a part of the barbecue is depicted schematically with the cover 4 being in the first, closed position A. In FIG. 12 the same view is shown but with the cover 4 being in the second, opened position B.

As can be seen by comparison of FIG. 11 and FIG. 12 the barycentre S of the cover 4 falls from a first level $h_A$ in the first position A (FIG. 11) to a second, lower level $h_B$ in the second position B (FIG. 12) when the cover 4 is opened.

As can be seen in FIG. 12 in the opened state of the cover 4 only an extension x protrudes upwards from the surface of the grilling element 3. The extension is preferably between 10% and 40% of the length L of the cover 4.

As a benefit of this the cover 4 disappears to a certain degree in the open position B in the carrier element 2 but allows a free sight to the grilling area 3 and a free communication. On the other hand the protruding part x of the cover gives a certain protection against the wind.

As a preferred embodiment the cover 4 is arranged at the rear side 8 of the carrier element 2 when being in the second position B.

To sum up a preferred embodiment of the invention is designed as follows: The outdoor barbecue has a top cover 4 that can be swung open into a vertical position and at the same time it can be lowered/slide down, at least in part, behind at the rear side of the barbecue. The barbecue further comprises that a bar area is arranged for social communication not only on the left and right side of the barbecue but also on its rear side. When the cover 4 is closed the barbecue will just be a bar-like table.

REFERENCE NUMERALS

1 Barbecue
2 Carrier element
3 Grilling area
4 Cover
5, 6 Means for moving the cover
5 Crank
6 Guiding element
7 Horizontal axis
8 Rear side of the carrier element
9 Tray panel
10 Tray panel
11 Tray panel
12 Tray panel
13 Bearing hole
14 Skewer
15 Bearing element
16 Front side of the barbecue
17 Compartment
A First position
B Second position
S Barycentre of the cover
$h_A$ First level
$h_B$ Second level
x Extension
L Length of the cover

We claim:
1. A barbecue comprising:
a carrier element including a rear side having a recess formed therein, the recess including a bottom wall and a back wall;
one or more tray panels positioned adjacent to the rear side of the carrier element;
a receiving slot at least partially defined between the rear side of the carrier element and the one or more tray panels, the receiving slot being in communication with the recess;
a grilling area being substantially horizontally orientated and being located at the top of the carrier element;
a cover that can be positioned in a generally horizontal first position in which the grilling area is covered and in a generally vertical second position in which the grilling area is accessible and at least a portion of the cover passes through the receiving slot between the one or more tray panels and the rear side of the carrier element and is positioned in the recess; and means for moving the cover between the first position and the second position, the means for moving comprising a guiding element connected between the carrier element and the cover, the guiding element being pivotally connected to the carrier element such that the guiding element pivots about a fixed horizontal axis, and the cover being slidable relative to the guiding element, wherein the means for moving enables the cover to simultaneously pivot and slide relative to the fixed horizontal axis when the cover is moved between the first position and the second position.

2. A barbecue according to claim 1, wherein the cover has a substantially flat shape.

3. A barbecue according to claim 1, wherein the center of mass of the cover is moved from a first level to a second, lower level when the cover is moved from the first position to the second position.

4. A barbecue according to claim 1, wherein, when the cover is in the second position, an upper end of the cover protrudes an extension upwards from an upper surface of the grilling area which is between about 10% and about 40% of the length of the cover.

5. A barbecue according to claim 2, wherein:
the means comprise two stationary guiding elements being fixed at the carrier element and being located laterally at both sides of the cover and two cranks machined in the lateral sides of the cover; and
the guiding elements protrude into the cranks.

6. A barbecue according to claim 2, wherein at least one of the one or more tray panels is arranged adjacent to the cover when being in the first position.

7. A barbecue according to claim 6, wherein the one or more tray panels is arranged adjacent to the cover on three sides of the cover.

8. A barbecue according to claim 6, wherein the cover when being in the first position and the at least one of the one or more tray panels has flushing upper surfaces.

9. A barbecue according to claim 1, wherein at least one bearing element for the skewer is arranged at the front side of the barbecue.

10. A barbecue according to claim 1, wherein the carrier element has at least one compartment.

11. A barbecue according to claim 10, wherein the compartment is thermally insulated.

12. A barbecue according to claim 11, wherein a refrigerator is arranged in the compartment.

13. A barbecue according to claim 1, wherein the barbecue is of the charcoal type.

14. A barbecue according to claim 1, wherein the barbecue has at least one electrical heating element.

15. A barbecue according to claim 1, wherein the barbecue has at least one gas heating element.

16. A barbecue according to claim 1, further comprising at least one bearing hole for a skewer arranged in the cover, extending horizontally when the cover is in the second position.

17. A barbecue comprising:
a carrier element including a rear side having a recess formed therein, the recess including a bottom wall and a back wall;
a grilling area substantially horizontally orientated and located at the top of the carrier element;
a cover including a top region and a side region having a U-shaped structure, the cover positionable in a generally horizontal first position in which the grilling area is covered and in a generally vertical second position in which the grilling area is accessible and at least a portion of the cover is positioned within the recess in the rear side of the carrier element; and
a guiding element including a cuboid-shaped body that is at least partially received within the U-shaped structure of the cover so that the cover is slidable relative to the guiding element, the guiding element being pivotally connected to the carrier element such that when the cover is moved between the first position and the second position the guiding element and the cover pivot together about a fixed horizontal axis and the cover slides relative to the fixed horizontal axis.

\* \* \* \* \*

UNITED STATES PATENT AND TRADEMARK OFFICE
CERTIFICATE OF CORRECTION

| | |
|---|---|
| PATENT NO. | : 8,607,776 B2 |
| APPLICATION NO. | : 12/528338 |
| DATED | : December 17, 2013 |
| INVENTOR(S) | : Jansson et al. |

It is certified that error appears in the above-identified patent and that said Letters Patent is hereby corrected as shown below:

Title Page, item (57), under "ABSTRACT"
Line 2, change "being substantial horizontal" to --being substantially horizontally--

In the Specifications

Column 1
Line 7, change "being substantial horizontal" to --being substantially horizontally--
Line 30, change "mention" to --mentioned--
Line 34, change "even smoke and heat it lead" to --it leads smoke and heat--
Line 61, change "forth and back" to --back and forth--
Line 66, change "substantial arranged" to --substantially arranged--

Column 2
Line 26, change "drawings embodiments" to --drawings, embodiments--
Line 33, change "an later phase" to --a later phase--
Line 52, change "closed position and" to --closed position, and--
Line 62, change "well known manner" to --well-known manner--
Line 67, change "position A, B to the other manually" to --position A to the other B manually--

Column 3
Line 12, change "panels is arranged" to --panels are arranged--
Line 22, change "bearing hole 13" to --bearing holes 13--
Line 38, change "can kept" to --can be kept--
Line 54, change "relatively to the carrier element 2 and can slide relatively" to --relative to the carrier element 2 and can slide relative--
Line 55, change "to the double-headed" to --of the double-headed--

Signed and Sealed this
Fifteenth Day of April, 2014

Michelle K. Lee
*Deputy Director of the United States Patent and Trademark Office*

Column 4
Line 7, change "and a free communication" to --and free communication--
Line 8, change "cover" to --cover 4--
Line 16, change "lowered/slide down" to --lowered/slid down--